United States Patent Office 2,827,281
Patented Mar. 18, 1958

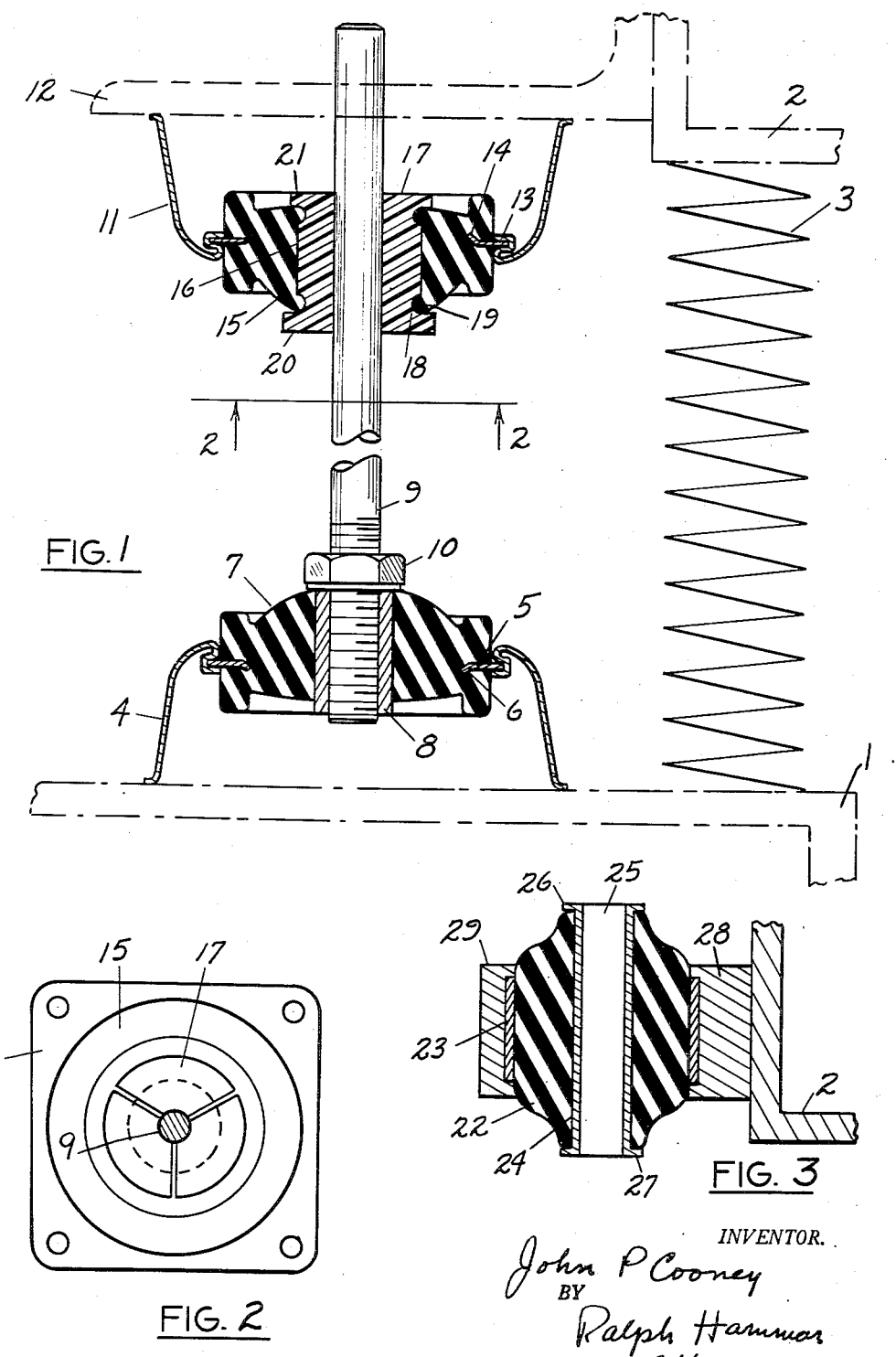

2,827,281

RESILIENT MOUNTING AND FRICTION DAMPER

John P. Cooney, Erie, Pa., assignor to Lord Manufacturing Company, Erie, Pa., a corporation of Pennsylvania Application January 13, 1955, Serial No. 481,509

2 Claims. (Cl. 267—9)

This invention is a mounting for damping vibrations. In a preferred form, a split sleeve of friction material such as nylon is pressed into the bore of a rubber mounting and is held by the contractile force of the rubber against a rod which extends through the sleeve. When the rod is supported for universal movement, the damping is effective in all directions although most effective along the axis of the rod. The rubber mounting, in addition to supplying the force on the friction damper, accommodates misalignment or tilting of the rod and supplies a resilient restraining force through the friction on the rod.

In the drawing, Fig. 1 is a fragmentary elevation of a mounting system, Fig. 2 is a section on line 2—2 of Fig. 1, Fig. 3 is a section through a modification.

Fig. 1 of the drawing shows a resilient mounting system having a supporting member 1 and a supported member 2 connected by a resilient mounting diagrammatically indicated as the spring 3. The spring 3 provides a vibration isolating connection between the supporting and supported members. In order to prevent excessive amplitudes of vibration occurring under conditions of resilience or shock, the spring mounting illustrated at 3 is supplemented by a combined resilient mounting and friction damper.

The supplemental mounting and damper has a holder 4 fixed to the supported member 1 and carrying a sheet metal plate 5 having a flanged opening 6 at its center embedded in and bonded to an annular body 7 of rubber, a term including natural rubber and equivalent synthetic elastomers. At the center of the rubber body 4 is bonded a threaded tubular sleeve 8 into the upper end of which is threaded a rod 9 locked in place by a jam nut 10. The rubber body 7 restrains movement of the lower end of the rod 9 in all directions and from one aspect provides a universal support or joint for the lower end of the rod. At the upper end of the rod 9 is another resilient mounting having a holder 11 fastened to a bracket 12 fixed to the supported member 2 and carrying at its center a plate 13 having a flanged opening 14 embedded in and bonded to the outer part of an annular body 15 of rubber. At the center of the rubber body 15 is a bore 16 into which is pressed a longitudinally split sleeve 17 of suitable friction material such as nylon. In the outer part of the split sleeve 17 are circumferential grooves 18 into which fit corresponding annular beads 19 on the rubber body 15 which serve to anchor the slit sleeve axially within the bore 16 of the body. There also are upper and lower flanges 20 and 21 on the split sleeve which further assist in keeping the sleeve in fixed axial position with respect to the rubber body 15. The inherent resilience of the rubber exerts a contractile force on the split sleeve 17 holding it in tight frictional engagement with the upper end of the rod 9. The rubber body 15 also yields to accommodate misalignment in case the bore of the split sleeve 17 is not precisely aligned with the axis of the rod 9. The rubber body 15 also yields to accommodate universal tilting of the rod 9 in all directions.

Until the force of friction between the sleeve 17 and the rod 9 is overcome, the rubber body 15 serves as part of the resilient connection between the supporting and supported members 1 and 2 and enters into and assists in the vibration isolation. As soon as the friction force between the sleeve 17 and the rod 9 is exceeded, the sleeve slips on the rod thereby introducing a friction damping force which tends to limit the amplitude of vibration. Even while functioning as a friction damper, the rubber body 15 still acts as a spring because the friction force is transmitted through the rubber body to the member 2. Accordingly, under all conditions the rubber body 15 serves as part of the vibration isolating structure.

No attempt has been made to illustrate the complete mounting system which ordinarily will consist of one or more resilient mountings connected in load carrying relation between the supporting and supported members 1 and 2 and one or more of the friction damping units described in detail which are usually oriented in the directions in which the maximum amplitudes of vibration occur. The vibration damping units are primarily effective to damp vibrations along the axis of the rod 9 but are also to a lesser extent effective to damp vibration in other directions because movement of the upper end of the rod transverse to its axis also causes a relative slippage between the rod and the friction damper sleeve 17. For applications where the universal movement of the rod 9 is not needed, the mounting 4—8 at the lower end of the rod can be replaced by a rigid connection. Other forms of universal connections or joints for the lower end of the rod 9 may be used in systems where the added resilience provided by the illustrated mounting is not needed.

In Fig. 3 is shown another form of mounting and vibration damper which may be substituted for the mounting at the upper end of the rod 9 in Fig. 1. In this mounting, there is a tubular rubber body 22 having bonded to its outer surface a metal tube 23 and having at its center a bore 24 in which is pressed a longitudinally split tubular damper sleeve 25 having flanges 26 and 27 at the upper and lower ends which hold the damper in fixed axial relation to the bore 24. The mounting is attached to the supported member 2 by a split clamp comprising a part 28 fixed to the supported member and a complementary part 29 which is clamped thereto by any suitable means (not shown). As in the Figs. 1 and 2 construction, the contractile force of the rubber body 22 holds the split sleeve 25 in frictional contact with the upper end of the rod 9 thereby providing the friction damping force. The rubber body 22 also yields to accommodate misalignment and tilting of the rod 9. Until there is slippage between the sleeve 25 and the rod, the rubber body 22 forms part of the vibration isolating connection between the supporting and supported members and even after the slippage the rubber body 22 enters into the vibration isolation because the friction damping force is transmitted from the rod 9 through the sleeve and the rubber body 22 to the supported member 2.

What is claimed as new is:

1. In a resilient mounting system, supporting and supported members, a rod connected to one of the members, a resilient mounting having an outer part connected to the other of the members and having an opening therein, a cylindrical body of rubber extending through said opening and bonded to said outer part, said body of rubber having a bore therein through which the rod extends, said bore being spaced from the opening in said outer part to permit axial movement of the bore relative to said outer part, and a split sleeve of friction material fixed in the bore and held by the contractile force of the rubber against the outer surface of the rod to provide a friction damping force on the rod and to transmit the friction force to said other member through the rubber, said sleeve likewise being spaced from the opening in said outer part to permit axial movement of the sleeve relative to said opening.

2. In a resilient mounting system, supporting and supported members, a rod connected to one of the members by a universal joint, a resilient mounting having an outer part connected to the other of the members and leaving an opening therein, said mounting having a body of rubber fixed to said outer part and extending through said opening, said body of rubber having a bore through which the rod extends, said bore being coaxial with the rod and spaced from the opening in said outer part to permit both axial and angular movement of the rod relative to said outer part, and a split sleeve of friction material fixed in the bore and held by the contractile force of the rubber against the outer surface of the rod to provide a friction damping force on the rod and to transmit the friction force to said other member through the rubber, said split sleeve likewise being spaced from the opening in the outer part to permit both axial and angular movement thereof relative to said outer part, said rubber being free to yield axially and angularly relative to the bore whereby the rubber has the dual function of serving as a resilient mounting in both axial and angular directions in addition to providing a friction damping force.

References Cited in the file of this patent
UNITED STATES PATENTS

| | | |
|---|---|---|
| 1,707,490 | O'Connor | Apr. 2, 1929 |
| 1,713,914 | O'Connor | May 21, 1929 |
| 2,088,450 | Tea et al. | July 27, 1937 |
| 2,360,748 | Whistler et al. | Oct. 17, 1944 |
| 2,562,595 | Blue | July 31, 1951 |